United States Patent [19]

Ward

[11] Patent Number: 4,985,842

[45] Date of Patent: Jan. 15, 1991

[54] DYNAMICALLY VARIABLE DISPLAY AND PRINTER SUBSYSTEM FOR USE IN SORTING OPERATIONS

[76] Inventor: Robert L. Ward, 1129 E. Vaughn, Tempe, Ariz. 85283

[21] Appl. No.: 326,028

[22] Filed: Mar. 20, 1989

Related U.S. Application Data

[63] Continuation-in-part of Ser. No. 124,052, Nov. 13, 1987, abandoned.

[51] Int. Cl.[5] .................... G06F 15/20

[52] U.S. Cl. .................... 364/478; 209/584

[58] Field of Search .................... 364/478, 468, 130; 209/546, 584, 900, 3

[56] References Cited

U.S. PATENT DOCUMENTS

| | | | |
|---|---|---|---|
| 4,578,759 | 3/1986 | Horii | 364/478 |
| 4,606,660 | 8/1986 | Bradshaw et al. | 400/62 |
| 4,632,252 | 12/1986 | Haruki et al. | 209/546 |
| 4,641,753 | 2/1987 | Tamada | 209/546 |

*Primary Examiner*—Jerry Smith
*Assistant Examiner*—Paul Gordon
*Attorney, Agent, or Firm*—Charles E. Cates; William H. Holloway; James H. Phillips

[57] ABSTRACT

A display and printer subsystem for use in a sorting operation with sorting apparatus in which information can be displayed and labels printed for the catagories of materials resulting from the sorting operation is disclosed. The display and printer subsystem includes a microprocessor which develops and sends address, data and external control signals over system buses, a plurality of display units, and a plurality of printer units. Each display unit includes an alphanumeric display module responsive to the application of control, enable, and data signals to write specified characters in specified display positions. Each display unit also includes a logic interface circuit adapted to receive the address signals, the display unit using the address signals to select a particular display module. Similarly, each printer unit includes a printer responsive to data signals, control signals and enable signals for printing alphanumeric data at predetermined media positions. Each printer unit is responsive to address signals that are used to select the printer. Associated with each display unit is a manually operated switch that causes the information displayed by the display unit to be printed. The files of the data to be displayed and printed are stored in a memory unit. The program of the microprocessor permits automatic selection of the relationship between the stored files and the sort parameters associated with the printer and display units. This relationship can be determined by an operator. The display and print subsystem is described with particular reference to manual and automatic sorting of mail.

14 Claims, 7 Drawing Sheets

DYNAMICALLY VARIABLE DISPLAY AND PRINTER SUBSYSTEM FOR USE IN SORTING OPERATIONS

This is a continuation-in-part of copending application Ser. No. 124,052, filed on Nov. 13, 1987, and now abandoned.

BACKGROUND OF THE INVENTION

1. Field of the Invention

This invention relates generally to the art of sorting and categorizing materials and, more particularly, to a subsystem for use with a multi-station sorter incorporating a display array and a printer array for dynamically variably assigning, identifying or designating information of the materials transferred to each station. The subsystem is described with particular reference to the postal sorting operations.

2. Description of the Related Art

The problems of sorting and handling large amounts of material are best exemplified by the postal service. In order to handle and sort efficiently very large volumes of mail, central post offices in large cities typically employ diverse sorting equipment in which the sorting function is based on reading the zip code provided as a suffix to the address set forth on a letter or package. In some sorting equipment, the zip code is visually read by an operator and manually entered from a keyboard as each piece of mail passes in front of the operator. This system, in the more highly automated post offices, is now used principally to sort mail for which more sophisticated electronic zip code readers have been unable to decipher the zip code. Thus, much of the mail is sorted through machines which incorporate optical character reading capability for either undertaking to read directly the Arabic numerals representing the zip code on a piece of mail or reading a previously provided bar code (as in mass commercial mailings) to effect the mail sort by zip code. Some sorting machines have the facility for selectively performing either sorting function, and some also have the facility for dynamically entering a bar code on a piece of mail as a result of successfully reading the Arabic numbers of the zip code. This technique increases the efficiency of the subsequent handling of that piece of mail because a bar code is most reliably read by electronic zip code readers.

Those skilled in the mail handling arts will appreciate that each piece of mail typically undergoes multiple sorts, particularly at the main post office of the point of destination, but also at the main post office of the point of origin and even at subsidiary post office stations. Further, and particularly relevant to the subject invention, those skilled in the art will also appreciate that the same sorting machines may be employed to sort at different levels during different sort sessions conducted throughout the working day. That is, an afternoon sort may be undertaken which is "finer" than an earlier sort carried out on the same machine in order to sort the run of mail down to (merely by way of example) an individual carrier. The mail may have been previously sorted to an individual substation by a preceding sort which might have been carried out a few hours earlier during a different phase of the operation day.

During the operation of a sorter, each piece of mail is physically routed to one of many stations according to the sensed zip code. The letter mail sorted to each station is periodically picked up and placed into a more or less standard "managed mail tray". Concurrently with that step, an encoded "slip label" is placed into a transparent pocket situated on the forward end of the managed mail tray to convey significant information relevant to the manner in which the mail in the particular tray should be handled during a subsequent sort at the same or a different post office.

Because of the multiple sorts at different levels which may be undertaken on a given sorting machine, it is necessary to provide a visual indication for the zip code assigned to each station for the sort currently underway. This feature is required to direct the person transferring the mail sorted to a given station into a managed mail tray to select the correct slip label for insertion into the pocket of the managed mail tray. In the past, this function has been undertaken by more or less clumsy expedients such as by simply using several different color coded labels permanently emplaced at each station. The person effecting the transfer of the mail to the managed mail tray relied on memory and on routine to recognize which zip code is being currently sorted to a given station. As well as being unreliable, this approach rigidly limits the flexibility of assigning diverse zip codes to each station of a sorter. Thus, those skilled in the mail handling arts will particularly well understand that it would be highly desirable to provide a single, easily readable and completely flexible display which, at all times, correctly indicates the zip code of mail currently being sorted to a given sorter station.

In the past, each station has had preprinted labels for insertion in the pocket of the mail tray. In practice, the preprinted labels have tended to be inadvertently removed from the storage locations and have frequently not been available when needed. In addition, care had to be taken to insure that the correct label (of several available preprinted labels for any given station) was inserted in the tray pocket. Therefore, it would be highly desirable to provide a printer proximate a sorting station that would print labels on demand having the information provided by the display defining the sort criteria.

Therefore, a need has been felt for a subsystem having a single easily readable and flexible display which, at all times, provides the correct information concerning the associated station and for a printer that can prepare a label with that information of the display on demand.

FEATURES OF THE INVENTION

It is therefore an object of the present invention to provide an improved sorting system.

It is a feature of the present invention to provide a sorting system in which each station is provided with a dynamically alterable display.

It is a feature of the present invention to provide a sorting system in which each station is provided with a dynamically alterable display and for which the information of the display can be printed.

It is a more particular feature of the present invention to provide a mail sorting system in which each station for receiving sorted mail is provided with a dynamically variable zip code (and, optionally, destination) display.

It is yet another particular feature of the present invention to provide a mail sorting system in which the zip code display for each station may be changed according to the characteristics of the sort to be performed.

It is still another particular feature of the present invention to provide a mail sorter which incorporates a liquid crystal display module at each station with the zip code and/or other sort criteria displayed at each station, the display being under the dynamic control of a central microprocessor.

SUMMARY OF THE INVENTION

These and other features are attained, according to the present invention, by a subsystem incorporating a multiplicity of display units for variably assigning a visual information for an associated station and incorporating an array of printers and associated apparatus for providing labels with the displayed information printed thereon. The display subsystem includes a microprocessor having a plurality of parallel output ports for sending address signals to display units and to printer units in accordance with information developed in the microprocessor in response to stored and entered data. The microprocessor also includes a plurality of multi-bit data ports and terminals providing control signals. A subsystem bus is connected to the address ports, the data ports and the control signal terminals for receiving and conveying address, data and control signals to a plurality of display units, each of which is situated in close proximity to one of the stations and to the printers, each of the printers typically being associated with a plurality of the display units. In the preferred embodiment, the display units each include a multi-digit alphanumeric liquid crystal display module having integral control and drive circuitry responsive to the application of display select and multi-binary digit parallel data signals to write a specified alphanumeric character to, and display the alphanumeric character at, a specified alphanumeric display position. Each display unit also includes a logic interface circuit connected to the system bus to receive address signals issued from the output port of the microprocessor. Each of the logic interface circuits includes a programmable decoder for establishing a unique identification code for the one display unit, a logic gate responsive to a unique output from the programmable decoder (in response to the reception of the unique address code) and to the concurrent reception of the external device enable control signal to issue a display select signal to the alphanumeric liquid crystal module. The programmable decoder can conveniently be implemented as a hard wired jumper assembly having, as inputs, logic levels and inversions thereof of the address signals appearing on the bus. The address signals from the appropriate address ports of the microprocessor select a printer unit and permit the control and data signals to determine the information to be printed on a label. Associated with each display unit (and station) is a switch coupled to a latch circuit. The switch, when activated by an operator, causes the printer associated with the activated display unit to print a label including at least a portion of the visually displayed information.

BRIEF DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawings of which:

DESCRIPTION OF THE PREFERRED EMBODIMENT

1. Detailed Description of the Drawings

Figure 1:
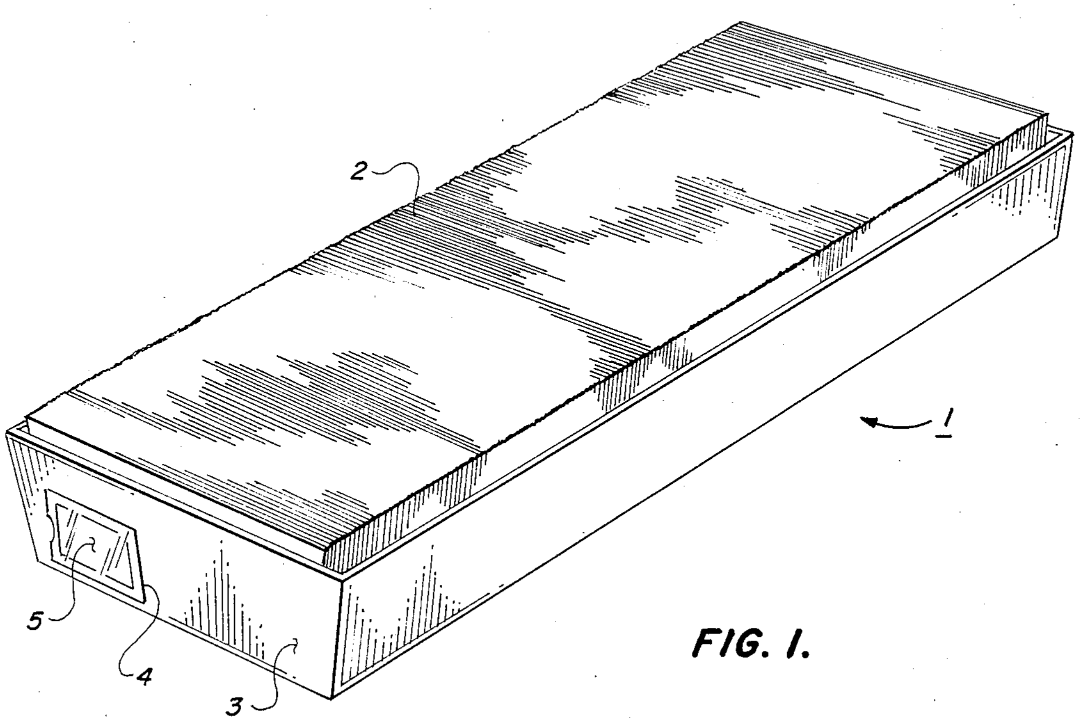
FIG. 1 illustrates a typical managed mail tray packed with sorted mail and having a slip label affixed to the front edge.

Referring now to FIG. 1, there is shown an exemplary managed mail tray 1 containing a load of letters 2 which have undergone at least one sort. The forward end 3 of the managed mail tray 1 includes a transparent pocket 4 containing a slip label 5 which carries indicia which will be useful in the subsequent sort or disposition of the mail 2.

Figure 2:
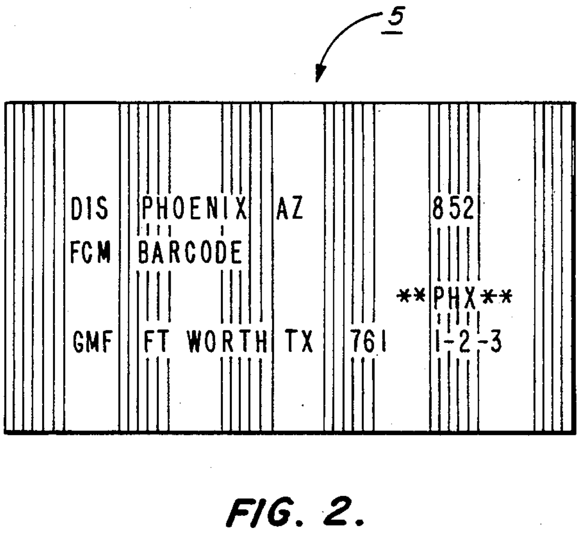
FIG. 2 illustrates an exemplary slip label employed to identify and set forth characteristics of a tray of sorted managed mail.

Attention is directed to FIG. 2 which illustrates a typical slip label 5 carrying exemplary information indicating that the mail in the managed mail tray originated in Phoenix and is destined for Fort Worth with each piece of mail in the tray having been encoded with a bar code. Thus, the mail handler in Fort Worth receiving the managed mail tray identified by the slip label 5 carried within the transparent pocket 4 will understand that the tray may be taken directly to a machine capable of reading bar code which, at the state of the art, is the most easily read and sorted code format processed by electronic reading devices.

Figure 3:
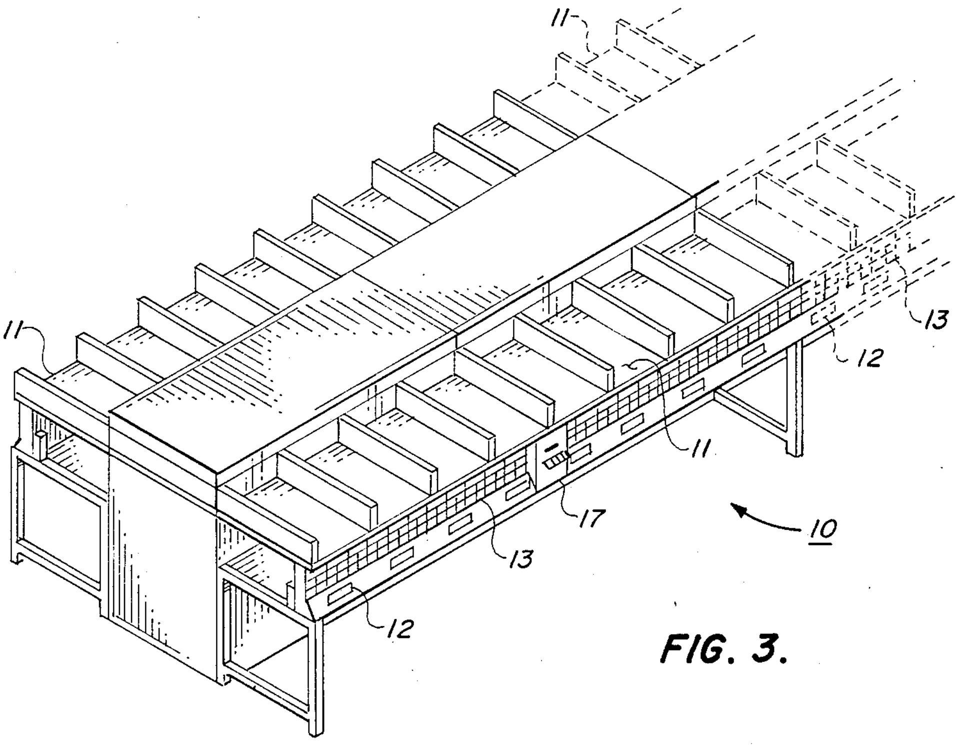
FIG. 3 is a partially broken away view of a mail sorter incorporating a plurality of stations for receiving sorted mail and also incorporating the subject zip code display subsystem.
Figure 4:
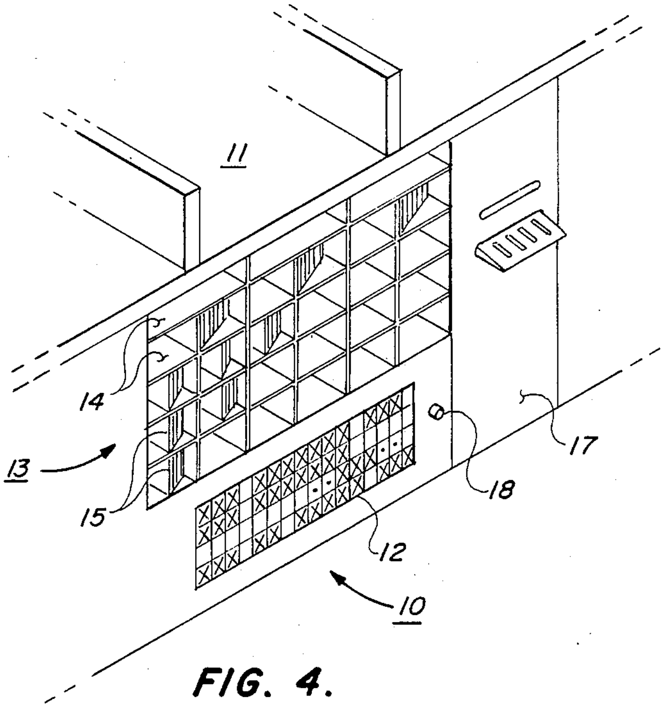
FIG. 4 is a partially broken away and enlarged view of the sorter illustrating more clearly the dynamically variable zip code displays provided at individual stations and also the manner in which various slip labels may be stored for ready access by the mail handler.

As has been discussed above, the stations at a multistation sorter have representations of destination zip codes which change throughout the day, and the mail handler must load a managed mail tray and select a slip label at each station in accordance with the current sort. A sorter incorporating the subject invention, which greatly facilitates this operation, is illustrated in FIGS. 3 and 4 to which attention is now directed. FIG. 3 is a partially broken away illustration of one end of a multistation mail sorter. Those skilled in the art will appreciate that the mail sorter includes, at the other end, apparatus for loading mail and reading the zip code on each piece of mail and physically directing the piece of mail to an individual station according to its zip code. Thus, the sorter 10 has a plurality of stations 11 for individually receiving mail sorted to a predetermined zip code level. A subsystem, according to the present invention, includes display units 12 for each station 11, each display unit 12 visually presenting the sort criterion assigned to each individual station 11 for the current sort. Situated below for display units 12 is a bin assembly 13 for holding a selection of slip labels which may be chosen by the mail handler in accordance with the zip code displayed at an individual display unit 12. A printer unit is associated with a plurality of stations 11. In the example illustrated in FIG. 3, eight stations 11 are associated with each printer unit 17.

Thus, referring particularly to FIG. 4, it will be seen that the bin assembly 13 includes an array of bins 14 containing diverse slip labels 15 which can be selected by the mail handler according to the sort criteria presented at an individual display unit 12 for a given station 11. Therefore, when sufficient mail has been sorted to a given station, it may be loaded into a managed mail tray 1 (FIG. 1), and by pressing button 18, the slip label can be printed by printer unit 17. In the alternative, a slip label may be selected from the array of bins 14 in accordance with the sort criteria presently displayed at the display unit 12 for that station (and other known characteristics of the sort) for insertion into the transparent pocket 4 of the managed mail tray. The level to which the mail is sorted can be indicated by the number of digits displayed at the display unit 12 which, in the presently preferred embodiment of the invention, can accommodate the expanded nine-digit zip code currently in use in the United States and corresponding zip codes (some of which are truly alphanumeric) in use in other countries.

Figure 5:
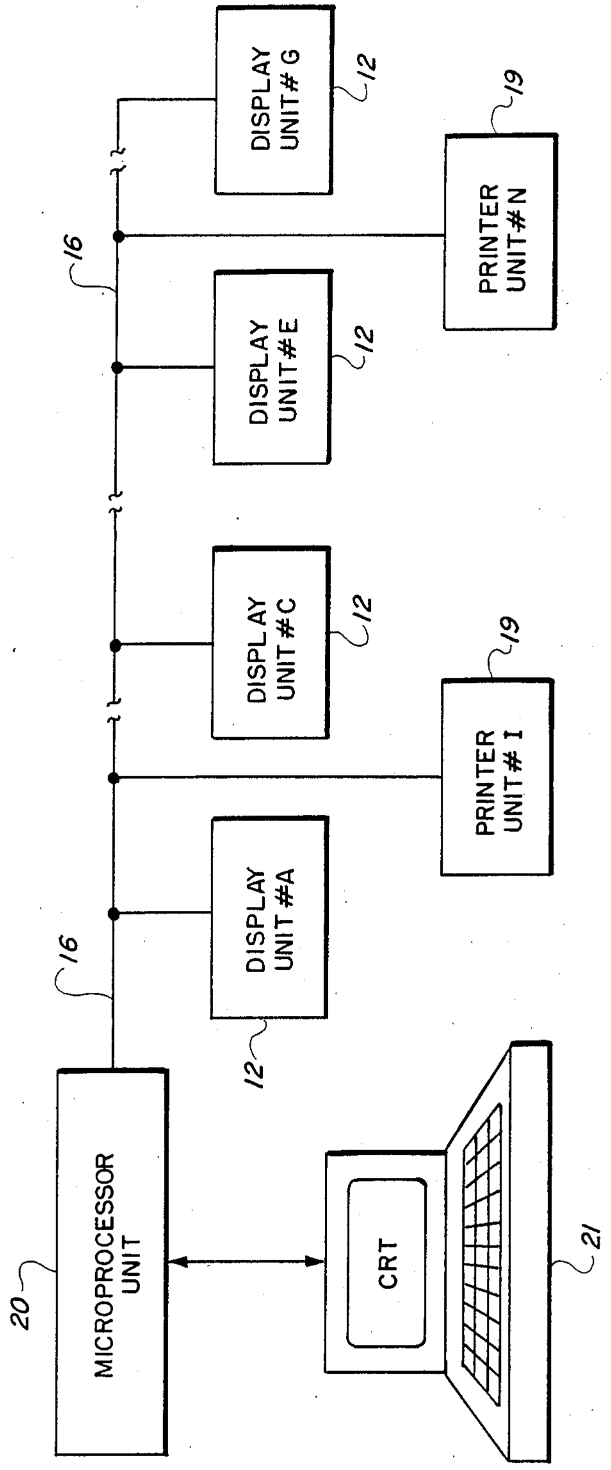
FIG. 5 illustrates the general organization of the display and printing subsystem according to the present invention.

Referring next to FIG. 5, the organization of the display and printer subsystem of the present invention is shown. The microprocessor unit 20 is coupled to the keyboard/CRT unit 21 (i.e., an operator's console) and is coupled to the subsystem bus 16. The subsystem bus 16, as will be seen in the subsequent description, is comprised of a plurality of subbuses. A plurality of display units 12 (A–G) are coupled to selected subbuses of the subsystem bus 16. A least one printer unit 19 is associated with a plurality of display units (i.e., one printer is associated and coupled to display units A–C while a second printer is associated with display units E–G). Each of the printer units 19 is coupled to selected subbuses of the subsystem bus 16.

Figure 6A:
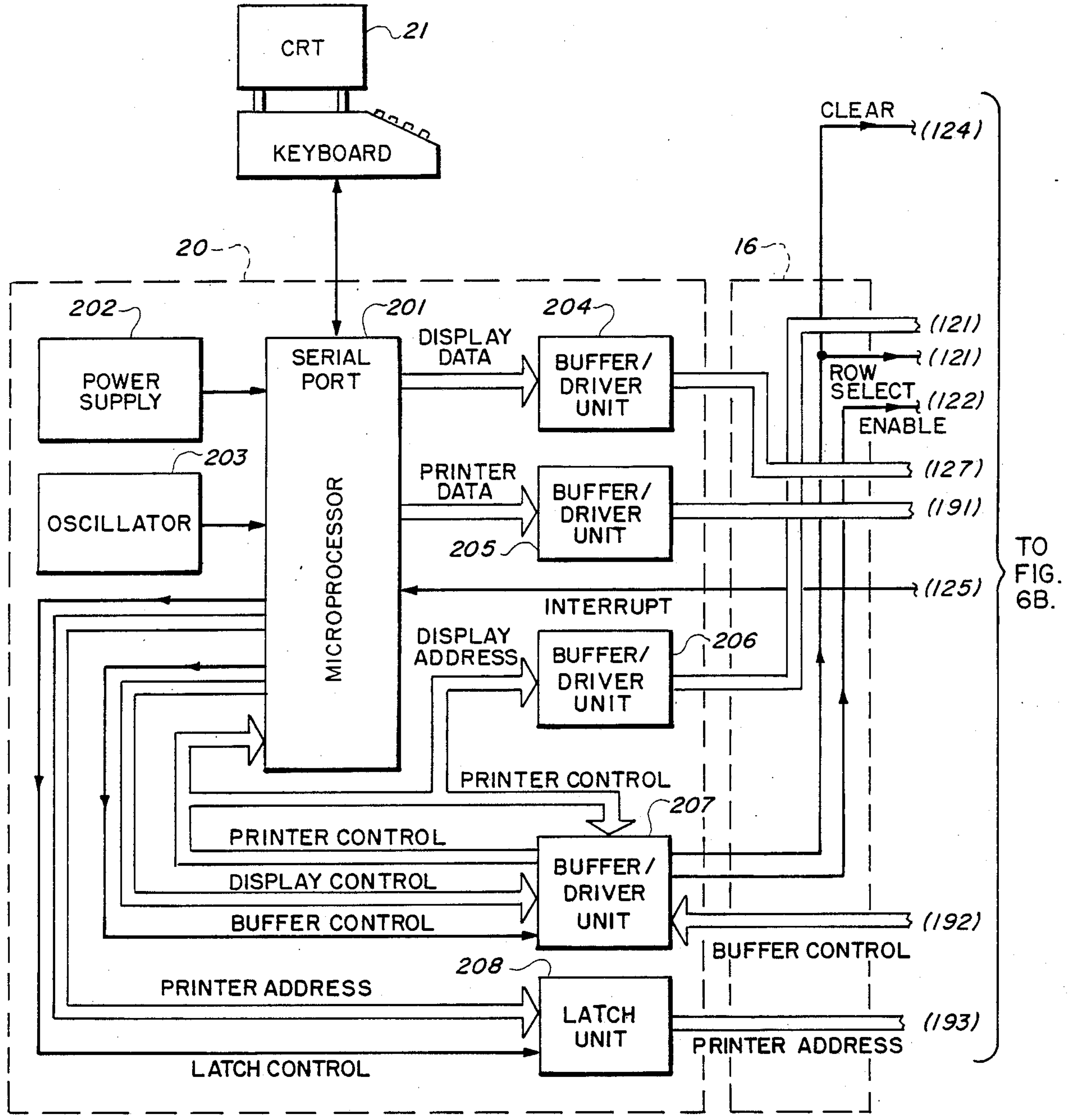
FIGS. 6A and 6B are a block diagram of the display and printing subsystem according to the present invention.
Figure 6B:
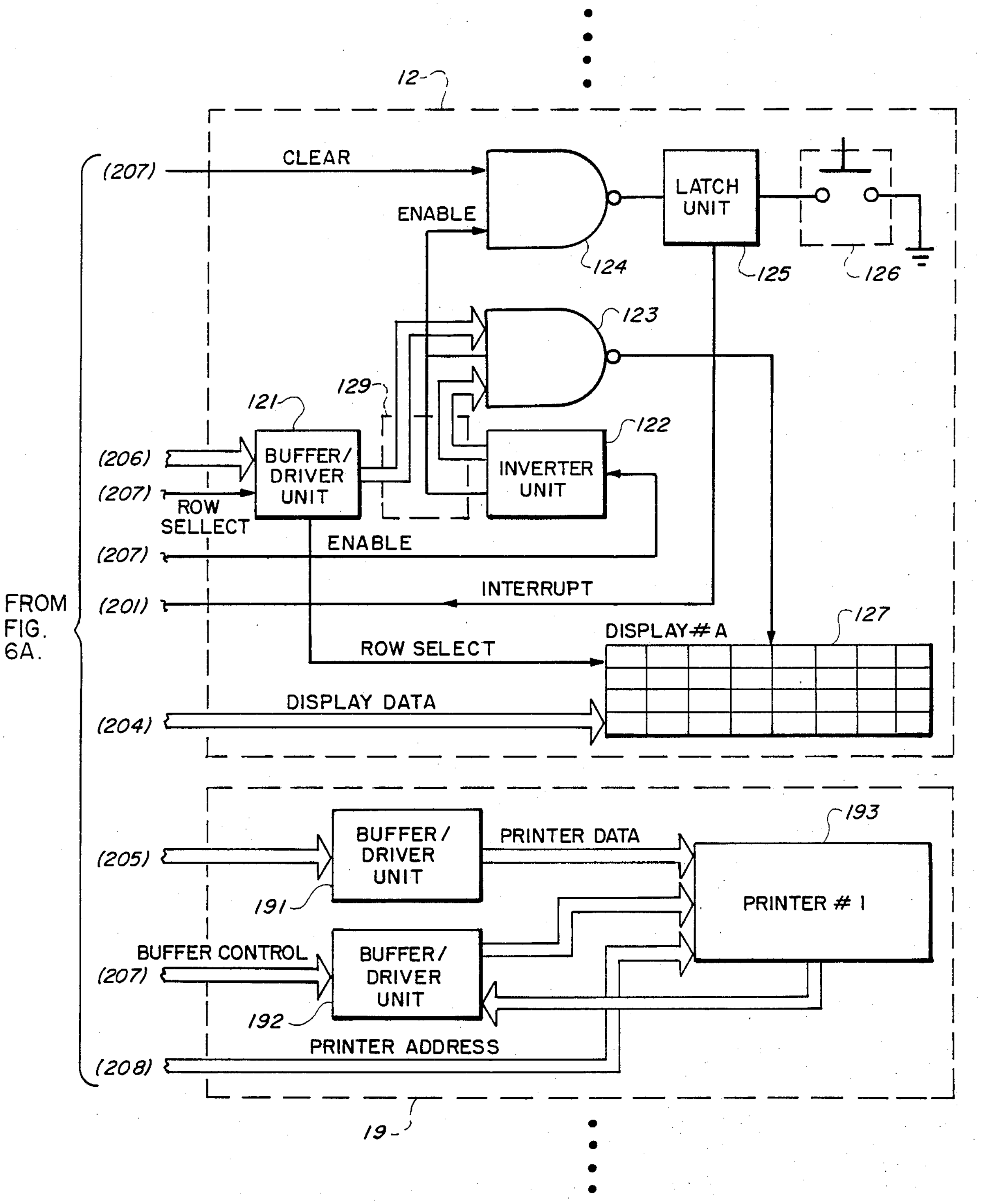

Referring next to FIG. 6, a more detailed block diagram of the subsystem of the present invention is shown. The microprocessor unit 20 includes a microprocessor 201 and associated apparatus. The associated apparatus includes power supply 202, oscillator 203, buffer/driver units 204–207 and latch unit 208. The power supply 202 provides the source of energy for the microprocessor 201 while the oscillator 203 controls the time base (i.e., the clock signals) for the microprocessor 201. As will be clear to those skilled in the art, the microprocessor includes storage apparatus addressable by the currently executing program for storing programs and files. The microprocessor 201 is coupled (by means of the serial port in the preferred embodiment) to the keyboard/CRT unit 21. The keyboard/CRT unit includes addressable storage apparatus for supplying additional files to be used by the subsystem. The display unit 12 includes buffer/unit 121, inverter unit 122, logic NAND gate 123, logic NAND gate 124, latch unit 125, switch 126 and display 127 (#A). The printer unit 19 includes buffer/driver unit 191 and 192 and printer 193 (#1).

Still referring to FIG. 6, the exchange of signals between the components of the subsystem can be summarized as follows. The microprocessor 201 provides display data signals through buffer/driver unit 204 to the display 127. The printer data signals are supplied from the microprocessor 201 through buffer/driver unit 205 and buffer/driver unit 191 to the printer 193. The printer address signals are generated in the microprocessor 201 and applied to the printer 193 via latch unit 208. The display address signals are applied through buffer/driver unit 206 to the buffer/driver unit 121 and to the inverter unit 122. Selected output signals from the buffer/driver unit 121 and inverter unit 122 are applied through jumper board 129 to the input terminals of logic NAND gate 123, an enable signal also being applied to an input terminal of logic NAND gate 123. The output signal from logic NAND gate 123 applied to display 127 along with row select signals and the display data signals determines the alpha-numeric content of the display 127. Printer control signals generated by the microprocessor 201 are applied through buffer/-driver unit 207 and through buffer/driver unit 192 to printer 193.

Display control signals generated by the microprocessor 201 are transmitted through buffer/driver unit 207, the resulting enable signal being applied through inverter unit 122 to an input terminal of logic NAND gate 123 and the resulting row select signal being applied through the buffer/driver unit 121 to the display 127. Buffer control signals from the microprocessor unit 201 are applied to buffer/driver unit 207 while the microprocessor applies a latch control signal to latch unit 208. Control signals from the printer 193, such as BUSY or ACKNOWLEDGE signals, are transmitted through buffer/driver unit 192 and through buffer/driver unit 207 to the microprocessor. A manually operated switch 126, when activated, can cause an INTERRUPT signal to be latched by latch unit 125 and applied to the microprocessor 201. The ENABLE signal applied to the input terminal of the logic NAND gate 123 is applied to an input terminal of logic NAND gate 124. A second input terminal of logic NAND gate 124 receives a CLEAR LATCH (control) signal. An ENABLE signal and a CLEAR LATCH signal applied to the input terminal of logic NAND gate 124 clears the INTERRUPT signal from latch unit 125.

Figure 7:
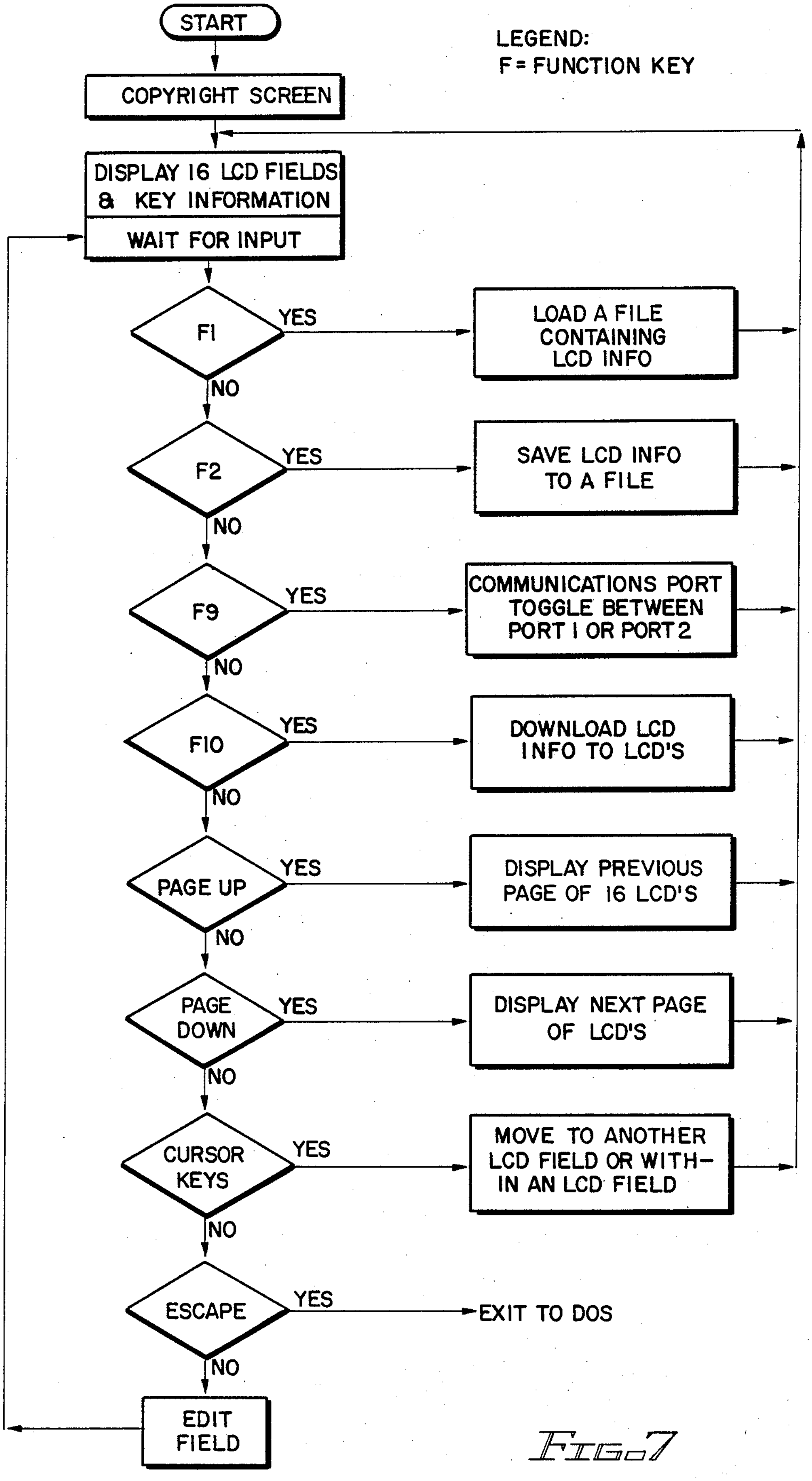
FIG. 7 is a simplified flow chart of a representative program which may be employed in the microprocessor of the display subsystem to effect the dynamic display of zip codes at each station of the sorter.

Software for implementing this change of display may be prepared according to the use for which each individual sorter is to be employed. For example, if the sorter is to have four possible configurations and has 128 stations, the corresponding information, e.g., for the zip code numbers and (optionally) destinations to be displayed at each station during each sort, may be resident in ROM, and the operator need only select which run is current. Typically, the software also provides for operator intervention to change any one or more of the zip codes to be displayed at a given station, in effect, obtaining manual override. This function can be extended as far as may be desirable for a given sorter even to the extent of providing for manual entry of the information to be displayed at each and every station for a given sort. It will be understood, then, that the software can and will take diverse forms according to the specific use to which a given sorter will be placed. By way of example only, reference may be taken to FIG. 7 which is a simplified flow chart of one such implementation.

Figure 8:
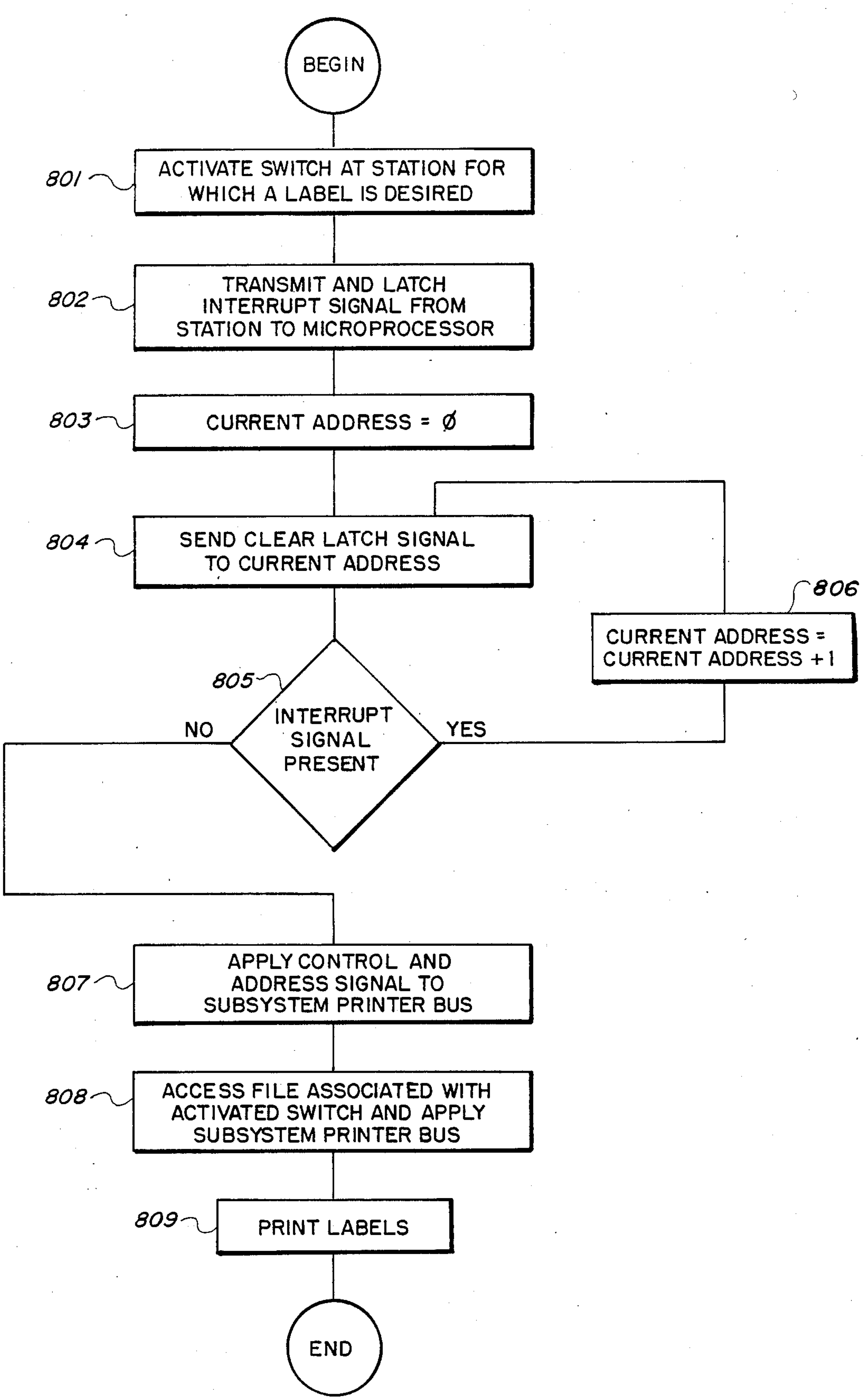
FIG. 8 is a flow diagram of the procedure for printing a label with the same information as the related display according to the present invention.

Referring to FIG. 8, the procedure for printing a label having the same information as is displayed by the display unit is illustrated. In step 801, the switch associated with the station for which a label describing the sort criteria required is activated. The activation of the switch causes an INTERRUPT signal to be applied to the microprocessor, the INTERRUPT signal being latched in step 802. In response to the INTERRUPT signal, the microprocessor executes a procedure in which a clear signal is applied to a sequence of display unit addresses. The procedure is begun by setting the ADDRESS=0 in step 803. In step 804, a CLEAR LATCH signal is sent to the display unit of the current address. After the CLEAR signal has been transmitted, the microprocessor determines if the interrupt signal is still present in step 805. When the INTERRUPT signal is still present, the ADDRESS is incremented to the next sequential ADDRESS in step 806 and a CLEAR LATCH signal is transmitted to the display unit associated with the current ADDRESS. The presence of the INTERRUPT signal is determined in step 805 and the procedure is continued until, in step 805, the INTERRUPT signal is determined no longer to be present. The control signals and the address signals associated with the display unit for which a label is required is applied to the subsystem bus in step 807. In step 808, the information in the file from which the visual display associated with the display unit requesting a label is accessed and the data of the file transferred to the associated printer where the label is printed in step 809.

2. Operation of the Preferred Embodiment

The subsystem of the present invention permits the sort criteria for a multiplicity of stations to be visually displayed. In a disciplined sort sequence, the criteria at each level of the sort can be preestablished and associated with a predetermined station. Therefore, the keyboard/CRT unit can be used to activate a procedure by which the sort criteria information can be transferred to the display unit. The files can be stored in a R(ead)O(nly)M(emory) or the P(rogrammable)ROM. In the event that the sort criteria is not consistently associated with a station, then the visual display associated with each station can be entered by means of the keyboard/CRT unit. The association between the files used in providing the information to the display units and to the printers must be consistent with the sort/station relationship of the sorting machine. According to one embodiment of the invention, the processing system controlling the sorting and station allocation of the sorting system can apply files directly to the microprocessor unit for use displaying and printing the sort criteria.

As will be clear, the logic signal addresses of the files containing the sort criteria in the microprocessor unit are typically directly related to logic signal addresses of the display units. The logic signal addresses of the display units as well as the printer units provide a mechanism for directing data signals, generated by the microprocessor unit and applied to the subsystem bus, to the correct unit. Control signals are provided by the microprocessor that are specific to the display unit and to the printer unit.

In the preferred embodiment, a multi-digit alphanumeric liquid crystal display is used which can display four rows of 16 display positions. This number of positions can accommodate both the conventional United States five digit zip code and the finer nine digit zip code as well as foreign zip codes which may include alphabetic characters along with a destination. However, the present invention can easily be adapted to accommodate other displays.

The subsystem of the present invention is suitable for retrofitting with existing sort apparatus. In the existing apparatus, a bin for storing an assortment of slip labels is typically provided at each station to facilitate the selection of a slip label for subsequent identification of the characteristics of a tray of mail sorted to a station. The printer unit of the present invention can be used to obviate the need for these bins or to augment the function of these bins by providing unavailable labels. The printer unit eliminates the need for familiarity with the location of the labels within the bins, the printer unit providing the information related to the currently active display.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. A display and printer subsystem for use with a multi-station sorting system, each station having sort criteria assigned thereto, said each station receiving sorted material determined by said assigned sort criteria, said subsystem comprising:

- a microprocessor unit, said microprocessor unit having sort files stored therein, wherein each sort file is derived from a sort criteria;
- a plurality of display devices, each display device located in a predetermined physical relationship with one of said stations, said physical relationship causing said each display device to be identified with said one station, said microprocessor transferring data signals to said each display device from a sort file derived from a sort criteria assigned to said identified station;
- a plurality of printers, each of said printers assigned to a preselected set of said display devices; and
- a plurality of switch means, each of said switch means located in a preselected physical relationship with a one of said stations, said preselected physical relationship identifying said each switch means with said one station, wherein activation of a selected switch means causes a printer assigned to a station identified with said selected switch means to print data from a sort file derived from a sort criteria assigned to said station identified with said selected switch means.

2. The subsystem of claim 1 wherein each of said switch means includes a latch circuit, an activated switch means causing said latch circuit to apply an interrupt signal to said microprocessor.

3. The subsystem of claim 2 wherein said microprocessor applies a clear signal to said each of said latch circuits in sequence until a removal of said interrupt signal, a removal of said interrupt signal identifying an address of said activated switch means.

4. The subsystem of claim 1 wherein said display means includes a multi-digit alphanumeric liquid crystal display.

5. The subsystem of claim 1 wherein said multi-station sorting system is used to sort mail, said sort files including zip code information.

6. The subsystem of claim 5 wherein mail sorted by said sorting system is placed in a tray associated with each station, said printing means providing labels for said tray identifying a sort criterion.

7. The subsystem of claim 1 further comprising a plurality of sort modes, each sort mode assigning different sort criteria to each of said stations, wherein said different sort criteria have different sort files derived therefrom.

8. A display and printer subsystem for use in a multi-station sorting system, each station of said multi-station sorting system having a sort criteria assigned thereto, wherein said sorting system distributes materials to each of said stations according to said assigned sort criteria, said subsystem comprising:

a processing unit having a multiplicity of sort files, each of said sort files including data for visual display derived from a one of said sort criteria;

a multiplicity of display units, each of said display units identified with a one of said stations, said processing unit transferring data for visual display from a sort file to a receiving display unit, said receiving display unit identified with a station to which a sort criteria from which said sort file is derived is assigned;

a multiplicity of switches, each of said switches assigned to a one of said display units; and a printer unit coupled to at least one of said switches, wherein activation of a first switch causes data for visual display from a sort file derived from a sort criteria assigned to a station having a display unit assigned to said first switch to be transferred to said printer unit.

9. A display and printer subsystem of claim 8 wherein each of said printers is coupled to a plurality of switches.

10. The display and printer subsystem of claim 9 wherein activation of said first switch causes an interrupt signal to be applied to said processing unit, said processing unit sending a clear interrupt signal to each of said switches in sequence until said interrupt signal is removed, a removal of said interrupt signal identifying a station and a sort file derived from sort criteria assigned to said station identified by said interrupt signal.

11. The display and printer subsystem of claim 9 wherein said multi-station sorting system is used to sort mail, said sort criteria being related to postal addresses.

12. The display and printer subsystem of claim 11 wherein said multi-station sorting system has a tray assigned to each station, said tray receiving materials sorted by a sort criteria of a station to which said tray is assigned, wherein activation of a switch identified with a station causes a label to be printed for a tray assigned to a station with a switch having said activation.

13. The display and printer subsystem of claim 8 further comprising a plurality of sets of sort files, each set of sort files related to different sort criteria for said stations.

14. The display and printer subsystem of claim 8 wherein each of said display units includes an alphanumeric liquid crystal display unit.

* * * * *